US008424073B2

(12) United States Patent
Sturms et al.

(10) Patent No.: US 8,424,073 B2
(45) Date of Patent: Apr. 16, 2013

(54) REFRESHING A PAGE VALIDATION TOKEN (75) Inventors: James Richard Sturms, Seattle, WA (US); Matthew Bryan Jeffries, Kirkland, WA (US); William James Griffin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1048 days.

(21) Appl. No.: 11/598,392

(22) Filed: Nov. 13, 2006

(65) Prior Publication Data
US 2008/0115201 A1    May 15, 2008

(51) Int. Cl.
*G06F 7/04*     (2006.01)
*G06F 17/30*    (2006.01)

(52) U.S. Cl.
USPC .......... 726/9; 726/8; 726/10; 726/20; 726/21; 713/159

(58) Field of Classification Search ............. 713/152, 713/159; 726/9, 21
See application file for complete search history.

(56) References Cited

U.S. PATENT DOCUMENTS

| | | | |
|---|---|---|---|
| 5,907,621 A | 5/1999 | Bachman et al. | |
| 6,058,193 A * | 5/2000 | Cordery et al. | 380/284 |
| 6,189,096 B1 | 2/2001 | Haverty | |
| 6,223,287 B1 | 4/2001 | Douglas et al. | |
| 6,360,254 B1 | 3/2002 | Linden et al. | |
| 6,393,468 B1 | 5/2002 | McGee | |
| 6,424,718 B1 | 7/2002 | Holloway | |
| 6,587,867 B1 | 7/2003 | Miller et al. | |
| 6,643,672 B1 * | 11/2003 | Lebel | 1/1 |
| 6,718,328 B1 | 4/2004 | Norris | |
| 6,795,554 B2 * | 9/2004 | Farkas et al. | 380/33 |
| 7,222,363 B2 | 5/2007 | Rice et al. | |
| 7,237,024 B2 * | 6/2007 | Toomey | 709/224 |
| 7,418,401 B2 * | 8/2008 | Bogasky et al. | 705/12 |
| 7,475,240 B2 * | 1/2009 | Shah et al. | 713/155 |
| 7,496,953 B2 * | 2/2009 | Andreev et al. | 726/8 |
| 7,500,099 B1 | 3/2009 | McElwee et al. | |
| 7,500,262 B1 * | 3/2009 | Sanin et al. | 726/2 |
| 7,577,752 B2 * | 8/2009 | Kimura | 709/232 |
| 7,610,617 B2 * | 10/2009 | Kelly et al. | 726/5 |
| 7,673,135 B2 | 3/2010 | Chin et al. | |

(Continued)

OTHER PUBLICATIONS

"Security Guide", Date: Mar. 2004, http://www.iona.com/support/docs/artix/2.0/security_guide/security_giude.pdf.

(Continued)

*Primary Examiner* — Nathan Flynn
*Assistant Examiner* — Viral Lakhia
(74) *Attorney, Agent, or Firm* — Merchant & Gould P.C.

(57) ABSTRACT

Methods and computer-readable media are provided for refreshing a page validation token. In response to a request for a form from a client, a server responds with the requested form, a page validation token, and a page token refresh program. The client executes the page token refresh program in response to a request to post the contents of the form to the server computer. The page token refresh program determines whether a preset period of time has elapsed since server computer generated the page validation token. If the period of time has not elapsed, the form is posted to the server with the page validation token and processed by the server computer. If the page timeout has elapsed, the page token refresh program refreshes the page validation token prior to posting the form by requesting an updated page validation token from the server.

15 Claims, 6 Drawing Sheets

U.S. PATENT DOCUMENTS

| | | | | |
|---|---|---|---|---|
| 7,734,527 | B2* | 6/2010 | Uzo | 705/37 |
| 7,921,226 | B2 | 4/2011 | Mukherjee et al. | |
| 2002/0103936 | A1 | 8/2002 | Jano et al. | |
| 2002/0143704 | A1 | 10/2002 | Nassiri | |
| 2002/0161721 | A1 | 10/2002 | Yuan et al. | |
| 2003/0182242 | A1* | 9/2003 | Scott et al. | 705/65 |
| 2003/0191964 | A1* | 10/2003 | Satyavolu et al. | 713/201 |
| 2003/0208562 | A1* | 11/2003 | Hauck et al. | 709/219 |
| 2004/0054966 | A1 | 3/2004 | Busch et al. | |
| 2004/0078604 | A1 | 4/2004 | Rice et al. | |
| 2004/0237040 | A1 | 11/2004 | Malkin et al. | |
| 2004/0243475 | A1* | 12/2004 | Aronsson et al. | 705/26 |
| 2004/0243852 | A1* | 12/2004 | Rosenstein | 713/201 |
| 2004/0250118 | A1* | 12/2004 | Andreev et al. | 713/201 |
| 2005/0021613 | A1* | 1/2005 | Schmeidler et al. | 709/203 |
| 2005/0044393 | A1* | 2/2005 | Holdsworth | 713/200 |
| 2005/0108625 | A1 | 5/2005 | Bhogal et al. | |
| 2005/0132222 | A1* | 6/2005 | Petrovic | 713/201 |
| 2005/0138362 | A1* | 6/2005 | Kelly et al. | 713/156 |
| 2005/0229239 | A1* | 10/2005 | Gray et al. | 726/4 |
| 2005/0240864 | A1* | 10/2005 | Leetaru et al. | 715/513 |
| 2005/0278792 | A1 | 12/2005 | Ramani et al. | |
| 2006/0020684 | A1 | 1/2006 | Mukherjee et al. | |
| 2006/0031262 | A1* | 2/2006 | Satoh et al. | 707/200 |
| 2006/0064322 | A1* | 3/2006 | Mascarenhas et al. | 705/2 |
| 2006/0130131 | A1* | 6/2006 | Pai et al. | 726/9 |
| 2006/0212696 | A1 | 9/2006 | Bustelo et al. | |
| 2006/0218391 | A1 | 9/2006 | Glazer et al. | |
| 2006/0224397 | A1 | 10/2006 | Morris et al. | |
| 2007/0022473 | A1* | 1/2007 | Hird | 726/9 |
| 2007/0088740 | A1* | 4/2007 | Davies et al. | 707/103 R |
| 2007/0136794 | A1* | 6/2007 | Chin et al. | 726/5 |
| 2007/0143831 | A1* | 6/2007 | Pearson et al. | 726/5 |
| 2007/0150591 | A1* | 6/2007 | Kimura | 709/225 |
| 2007/0239800 | A1* | 10/2007 | Eberlein | 707/203 |
| 2008/0115201 | A1 | 5/2008 | Sturms et al. | |
| 2010/0161973 | A1 | 6/2010 | Chin et al. | |

OTHER PUBLICATIONS

Chang, Dar-Jen, "Web Database Interface and Active Server Pages (ASP)", Date: Sep. 16, 2003.

Fu, et al., "Dos and Don'ts of Client Authentication on the Web", Date: Aug. 13-17, 2001, http://www.unisex.org/publications/library/proceedings/sec01/fu/fu_html/.

Amendment and Response to USPTO Final Office Action Mailed Mar. 13, 2008, cited in U.S. Appl. No. 10/440,375, filed Jul. 14, 2008, 7 pages.

Amendment and Response to USPTO Final Office Action Mailed Apr. 13, 2007, cited in U.S. Appl. No. 10/440,375, filed Jul. 13, 2007, 11 pages.

Amendment and Response to USPTO Non-Final Office Action Mailed Sep. 28, 2007, cited in U.S. Appl. No. 10/440,375, filed Jan. 8, 2008, 14 pages.

Amendment and Response to USPTO Non-Final Office Action Mailed Nov. 14, 200, cited in U.S. Appl. No. 10/440,375, filed Jan. 26, 2007, 10 pages.

Amendment and Response to USPTO Notice of Allowance Mailed Aug. 4, 2008, cited in U.S. Appl. No. 10/440,375, filed Oct. 8, 2008, 7 pages.

Notice of Allowance and Fee(s) Due, Mailed Aug. 4, 2008, cited in U.S. Appl. No. 10/440,375, 8 pages.

Notice of Allowance and Fee(s) Due, Mailed Oct. 31, 2008, cited in U.S. Appl. No. 10/440,375, 6 pages.

U.S. Appl. No. 11/297,285, filed Dec. 8, 2005, Amendment and Response filed Jul. 7, 2009, 10 pages.

U.S. Appl. No. 11/297,285, filed Dec. 8, 2005, Non-Final Office Action mailed Apr. 7, 2009, 18 pages.

U.S. Appl. No. 11/297,285 filed Dec. 8, 2005, Notice of Allowance mailed Nov. 16, 2009, 13 pages.

U.S. Appl. No. 12/715,204, Office Action mailed Aug. 2, 2011, 8 pgs.

USPTO Final Office Action, Mailed Mar. 13, 2008, cited in U.S. Appl. No. 10/440,375, 10 pages.

USPTO Final Office Action, Mailed Apr. 13, 2007, cited in U.S. Appl. No. 10/440,375, 13 pages.

USPTO Non-Final Office Action, Mailed Sep. 28, 2007, cited in U.S. Appl. No. 10/440,375, 11 pages.

USPTO Non-Final Office Action, Mailed Nov. 14, 2006, cited in U.S. Appl. No. 10/440,375, 10 pages.

USPTO Advisory Action mailed Jul. 26, 2007, in U.S. Appl. No. 10/440,375 (3 pages).

USPTO Amendment filed Nov. 2, 2011, in U.S. Appl. No. 12/715,204 (11 pages).

USPTO Final Office Action mailed Feb. 6, 2012, in U.S. Appl. No. 12/715,204 (9 pages).

USPTO Amendment, filed Jun. 25, 2012, cited in U.S. Appl. No. 12/175,204 10 pages.

US Non-Final Rejection mailed Jan. 29, 2013, in U.S. Appl. No. 12/715,204 (10 pages).

* cited by examiner

REFRESHING A PAGE VALIDATION TOKEN

CROSS-REFERENCE TO RELATED APPLICATIONS

This application is related to U.S. patent application Ser. No. 10/440,375, (now U.S. Pat. No. 7,500,099), filed on May 16, 2003, and entitled "Method for Mitigating Web-Based 'One-Click' Attacks," which is expressly incorporated herein by reference in its entirety.

BACKGROUND

A form on a World Wide Web ("Web") page mimics the usage of paper forms by allowing a user to enter data that is sent to a server for processing. For instance, a form may be utilized to enter name and address information on an e-commerce Web site. In order to use such a form, a user typically utilizes a computer mouse or other pointing device to place an insertion point into the fields of the form. Then, with a keyboard or other text input device, the user inputs text data into the form fields. Often, a button or other object will be displayed that the user actuates to post the inputted form data to the computer hosting the Web site.

Because of the stateless nature of most Web servers, a client computer can send form data to a Web server without having previously requested the form. For instance, if form data is posted to a Web server in a format that the server expects, the server will accept the data without first having sent the corresponding form. Because the server does not keep track of what it previously sent to each client computer, the Web server will accept the posted form data even though it had not previously transmitted the form to the sending client. This is referred to as "cross-site" posting.

An attacker with malicious intent can exploit cross-site posting to trick a user into unknowingly posting information to a Web site. For example, an attacker may induce a user to actuate a hypertext link, such as by sending an e-mail to the user that includes the link. By actuating the link, a user may unknowingly cause a script to be executed that posts data to a Web site. These attacks are often referred to as Cross-Site Request Forgery ("CSRF") attacks because they only require an authorized user to click on a hyperlink in order to post the embedded command to a Web server. By clicking the hyperlink, the user is unknowingly posting information to the Web server.

Some safeguards are available to prevent CSRF attacks. For example, one type of safeguard causes a Web server to refuse to accept form data posted after a predetermined period of time has elapsed since the form page was transmitted from the server. This type of safeguard, however, can be frustrating to users in several scenarios. For instance, if a user takes too long to fill out a form, the form will expire and the server will reject the form when it is finally posted. This can be especially frustrating for users if inputted form data is lost as the result of an expired form page.

It is with respect to these considerations and others that the disclosure made herein is provided.

SUMMARY

Methods and computer-readable media are provided herein for refreshing a page validation token. Utilizing a page validation token as described herein, Web forms may be provided in a manner that minimizes the ability of malicious users to perform CSRF attacks while at the same time eliminating the inadvertent expiration of forms for non-malicious users.

According to one aspect presented herein, a server computer is operative to receive and process requests for information pages that include forms. In response to a request for a form from a client computer, the server computer generates a page validation token. The page validation token includes data that allows the web server to later determine the time at which the form page was provided to the requesting client. Once the page validation token has been generated, the server responds to the request with the requested form, the page validation token, and a page token refresh program.

When the client computer receives the response, the form is displayed for editing. The client computer executes the page token refresh program in response to a request to post the contents of the form to the server computer. The page token refresh program determines whether a preset period of time, called the "page timeout," has elapsed since the server computer generated the page validation token. If the page timeout has not elapsed, the form is posted to the server with the page validation token and processed by the server computer in the manner described below. If, however, the page timeout has elapsed, the page token refresh program refreshes the page validation token by requesting an updated page validation token from the server computer.

In response to the request for an updated page validation token, the server attempts to validate the request. If the request cannot be validated, the server will not provide an updated page validation token. If the request can be validated, the server generates an updated page validation token and returns the token to the client computer in response to the request. The server computer may expose a remote application programming interface ("API") through which the client computer may request the updated page validation token.

In response to receiving the updated page validation token, the page token refresh program replaces the previous page validation token with the updated token. The client computer then posts the form data to the server computer along with the page validation token. When the server computer receives the post, the server computer regenerates the page validation token and compares the received page validation token with the regenerated page validation token. If the tokens are not identical, the server computer rejects the form data and an error is returned to the client computer.

If the server computer determines that the received page validation token and the regenerated page validation token are identical, the server then determines whether the form has expired. The form has expired if a second preset period of time, called the "validation timeout," has elapsed between the time the page validation token was originally generated by the server computer and the time at which the token was received back from the client computer with the post request. According to aspects, the page timeout is shorter than the validation timeout. According to other aspects, the page timeout may be calculated as a percentage of the validation timeout.

If the server computer determines that the form page validation token has expired, the request to post the form data is rejected and an error message may be returned to the client computer. If the form page validation token has not expired, however, the server computer accepts the request to post the form. The server computer may also return a success message to the client computer. According to other aspects, the client computer may expose an API through which applications executing on the client computer can obtain a page validation token from the server computer.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to systems, methods, and computer-readable media for refreshing a page validation token. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for updated a page validation token will be described. In particular, FIG. 1 is a network diagram illustrating aspects of an illustrative operative environment for the subject matter described herein that includes a client computer 102, a network 106, and a server computer 104.

Figure 1:
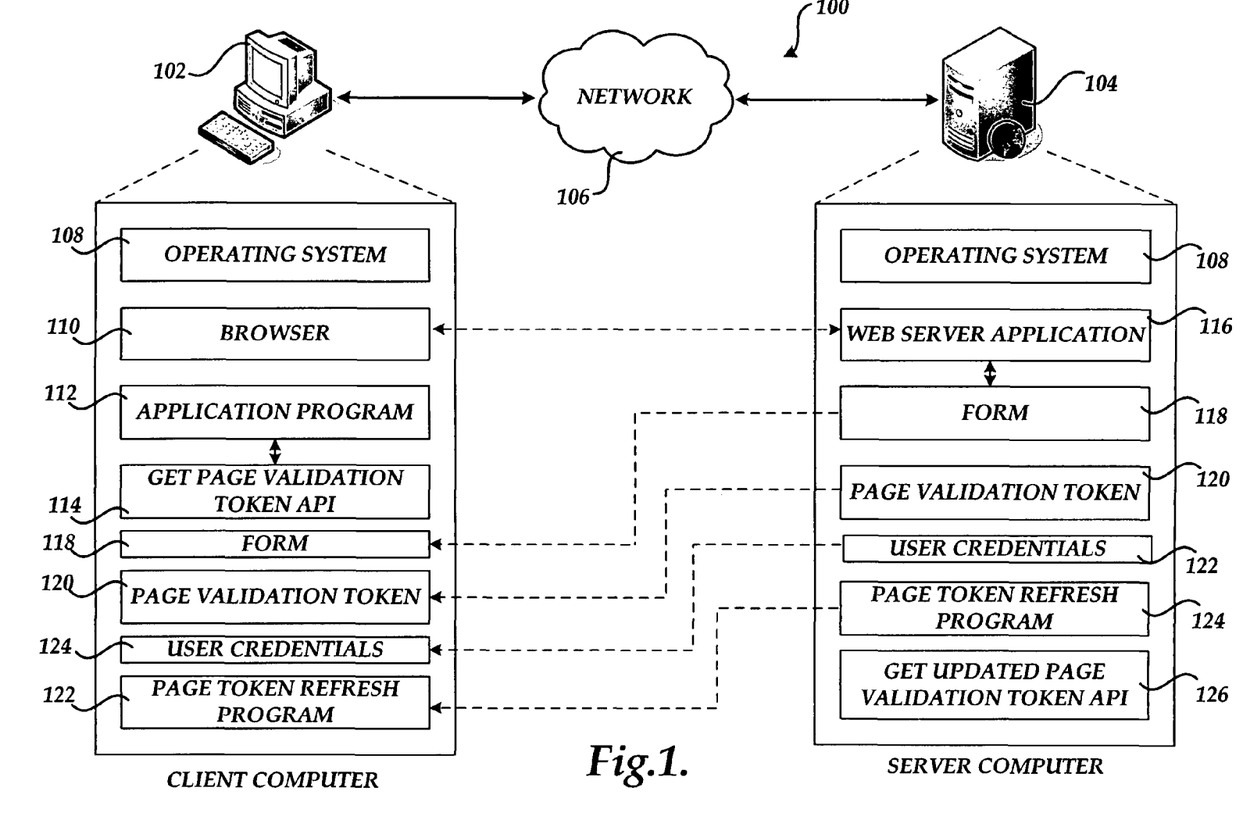
FIG. 1 is a network and software diagram showing an illustrative operating environment for the processes and computer systems described herein and several of the software components utilized by the computer systems described herein.

As shown in FIG. 1, the client computer 102 and the server computer 104 are communicatively coupled to one another through respective connections to the network 106. According to one implementation, the network 106 comprises the Internet. However, it should be appreciated that the network 106 may comprise a LAN, WAN, or other type of suitable network for connecting the client computer 102 and the server computer 104.

FIG. 1 also illustrates a number of software components utilized by the client computer 102 and the server computer 104. In particular, the client computer 102 includes an operating system 108 suitable for controlling the operation of a networked desktop or laptop computer. The server computer 104 includes an operating system 108 suitable for controlling the operation of a networked server computer. For instance, according to implementations, both the client computer 102 and server computer 104 may utilize the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that although the embodiments presented herein are described in the context of a desktop or laptop client computer 102 and a remote server computer 104, many other types of computing devices and systems may be utilized to embody the various aspects presented herein.

According to one implementation, the client computer 102 also includes a Web browser program (referred to herein as a "browser") 110. The browser 110 is operative to request, receive, and display information pages, such as Web pages, from the server computer 104. In particular, the browser 110 is operative to establish a connection with a Web server application 116 executing on the server computer 104. Through the connection, the browser 110 may request an information page that includes a form 118 from the server computer 104. A form on a Web page mimics the usage of paper forms by allowing a user to enter data that is sent to a server for processing. It should be appreciated that other types of Web pages allow a user to perform other types of actions that are also sent to the server 104 for processing in a similar manner. In addition to form pages, the embodiments presented herein are applicable to these types of Web pages.

When displayed by the browser 110, the form 118 may include a number of fillable data fields. A user may fill the forms by entering alphanumeric text into the form data fields. When the user has completed data entry into the form, the user may request that the form be posted back to the server computer 104. In response to such a request, the browser 110 sends a post request to the Web server application 116. If the post is accepted by the Web server application 116, the server computer 104 processes the data entered into the form data fields. Posts received from other types of non-form Web pages are processed in a similar manner.

As will be described in greater detail below, according to one aspect provided herein, the server computer 104 is operative to generate a page validation token 120 in response to a request for a form 118. The page validation token 120 includes data that allows the server 104 to authenticate the token 120 and to later determine the time at which the form 118 was provided to the client computer 102.

According to one implementation, the page validation token 120 is created by generating a hash value using predefined information, such as the user credentials 122 corresponding to a user of the client computer 102, and the current time at the time the page validation token 120 is generated. A one-way hash algorithm may be utilized to generate the page validation token 120. As known to those skilled in the art, a one-way hash algorithm is a cryptographic hash function that takes a string as input and produces a fixed length string as output, sometimes termed a message digest. It is very difficult to obtain the original input string from the fixed length output string. Any suitable one-way hash function may be utilized to create the page validation token 120.

In response to the request from the client computer 102 for the form 118, the server computer 104 returns the form 118, the page validation token 120, the time value used to generate the page validation token 120, and a page token refresh program 124. In one implementation, the page validation token 120, time value, and page token refresh program 124 are provided as hidden fields within the form 118 although these items may be provided in another manner.

As discussed in greater detail herein, the page token refresh program 124 is executed by the client computer 102 in response to receiving a request to post form data to the server computer 104. Such a request may come from a user, for instance, or from a programmatic element on the information page containing the form 118. According to one implementation, the page token refresh program 124 is written utilizing the JAVASCRIPT programming language. Other suitable programming languages may also be utilized.

When executed, the page token refresh program 124 is operative to determine whether a predefined period of time, called the "page timeout," has elapsed since the server computer 104 generated the page validation token 120. This is determined by computing the elapsed time between the current time and the time the page validation token 120 was generated as specified in the time value provided by the server computer 104 with the form 118. If the calculated amount of time does not exceed the page timeout, then the client computer 102 posts the form to the server computer 104 along with the page validation token 120 and the time value originally provided by the server 104. The server computer 104 then processes the post request in the manner described below. If the calculated amount of time exceeds the page timeout, however, then it becomes necessary for the page token refresh program 124 to obtain a new page validation token 120 from the server computer 104.

In order to obtain an updated page validation token 120, the page token refresh program 124 executing on the client computer 102 makes a remote procedure call to the get updated page validation token API 126. According to one implementation, the API 126 comprises a simple object access protocol ("SOAP") function which, when called, will return an updated page validation token 120 to the caller. The updated page validation token is generated in the manner described above for generating the original page validation token 120. Once the server computer 104 has generated the updated page validation token 120, the updated token 120 is returned to the client computer 102 along with data indicating the time the updated token was generated.

When the page token refresh program 124 receives the updated page validation token 120, it replaces the previous page validation token with the updated page validation token. In this manner, the client computer 102 only maintains the most recent page validation token 120. The page token refresh program 124 then transmits a post request to the Web server application 116 that includes the form data, the page validation token 120, and the time value provided by the server 104 in response to the request for the form 118.

In response to receiving the post request, the server 104 regenerates the page validation token 120 using the same predefined information along with the time value received with the post request. The server 104 then compares the page validation token received with the post request to the regenerated page validation token. If the two tokens are identical, the server 104 continues processing the post request in the manner described below. If the two tokens are not identical, the post request is rejected and an error message may be provided to the client computer 102.

If the server 104 determines that the two tokens are identical, the server 104 then determines whether the form 118 has expired. The form has expired if a second preset period of time, called the "server timeout," has elapsed between the time the page validation token 120 was originally generated by the server computer 104 and the time at which the token 120 was received back from the client computer 102 with the post request. The elapsed time is computed using the current time along with the time value received from the client computer 102 with the post request.

If the server computer 104 determines that the form has expired, the post request is rejected and an error message may be provided to the client computer 102. If, however, the server 104 determines that the form has not expired, the posted form data is processed by the server 104 and a success response is generated and transmitted to the client computer 102.

According to implementations, the page timeout may be set to a value that is less than the validation timeout to avoid a race condition. For instance, the page timeout may be set as 20 minutes while the validation timeout is set to 30 minutes. The page timeout may also be set as a percentage of the validation timeout. As an example, the page timeout may be set to 80 percent of the validation timeout.

According to other implementations, the client computer 102 may further include a get page validation token API 114. Through a call to the API 114, an application program 112 can retrieve a page validation token 120 from the server computer 104. Using such a page validation token 120, the application program 112 can provide properly formatted and authorized responses to the server computer 104. In this regard, it should be appreciated that although the various embodiments are presented herein in the context of a Web browser 110 communicating with the Web server application 116, the embodiments presented herein are not limited to the use of a Web browser 110. Other types of application programs 112 may utilize and update a page validation token 120 in the manner described herein. Additional details regarding these processes are provided below with respect to FIGS. 2A-2C and FIG. 3.

Figure 2A:
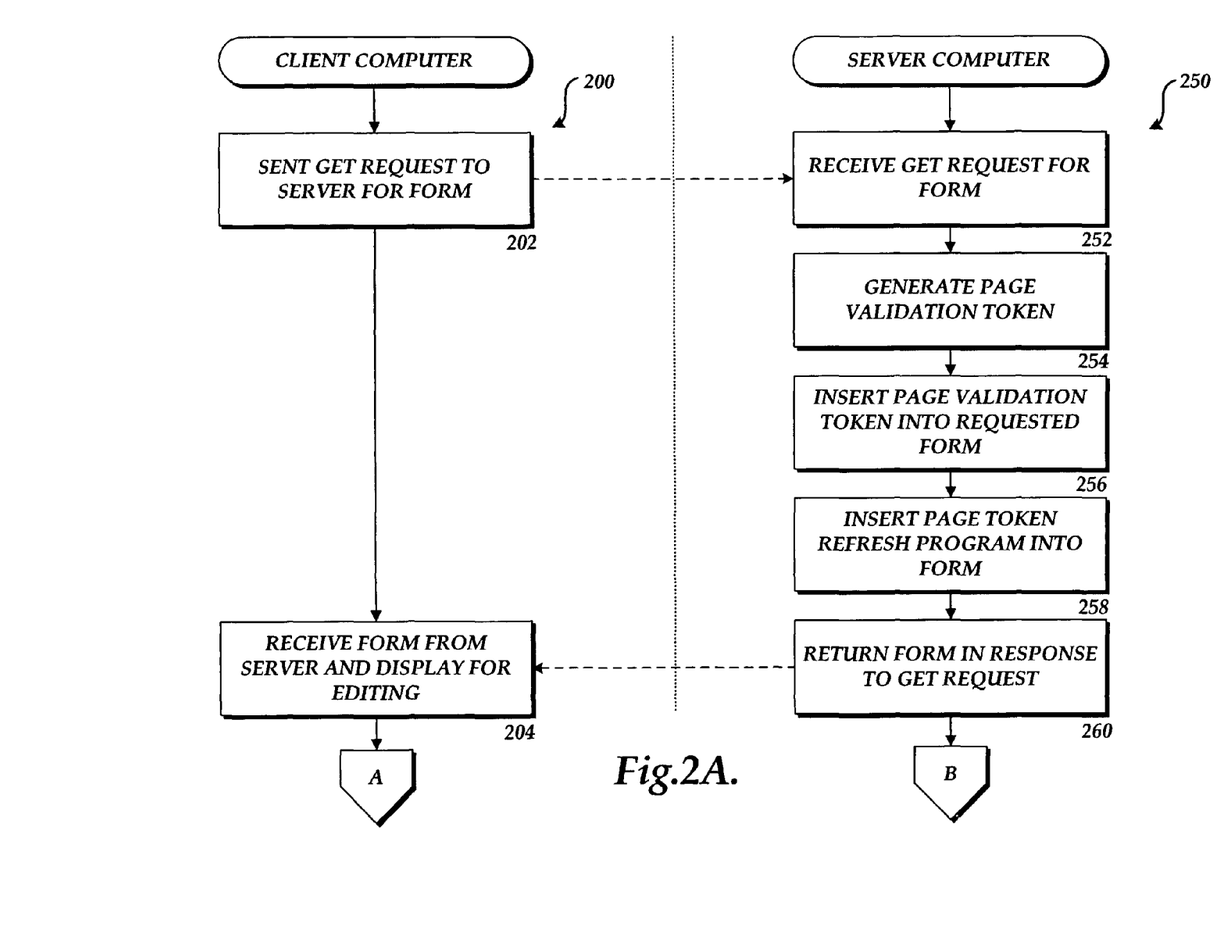
FIGS. 2A-2C and 3 are flow diagrams illustrating various processes provided herein for refreshing a page validation token.
Figure 2B:
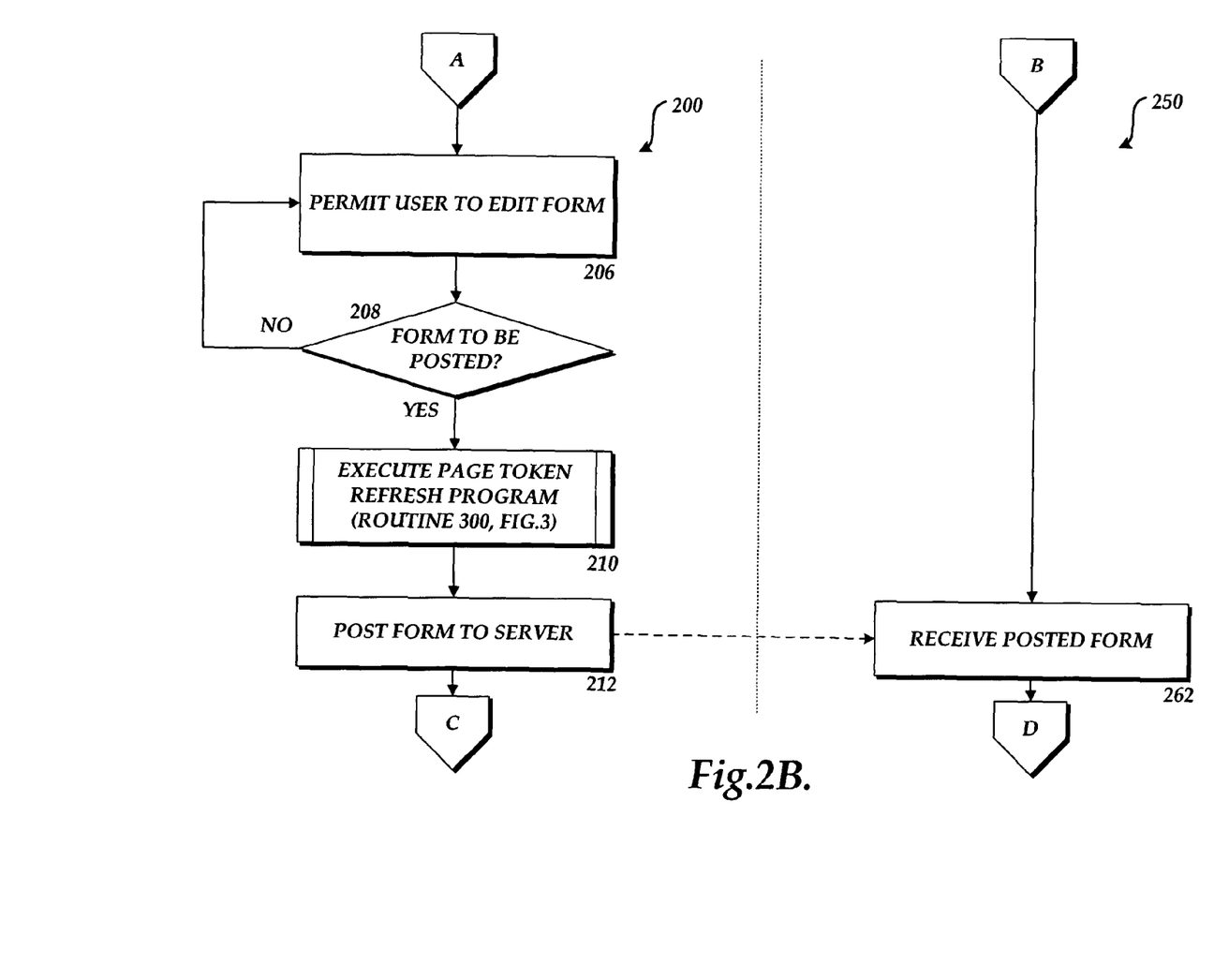
Figure 2C:
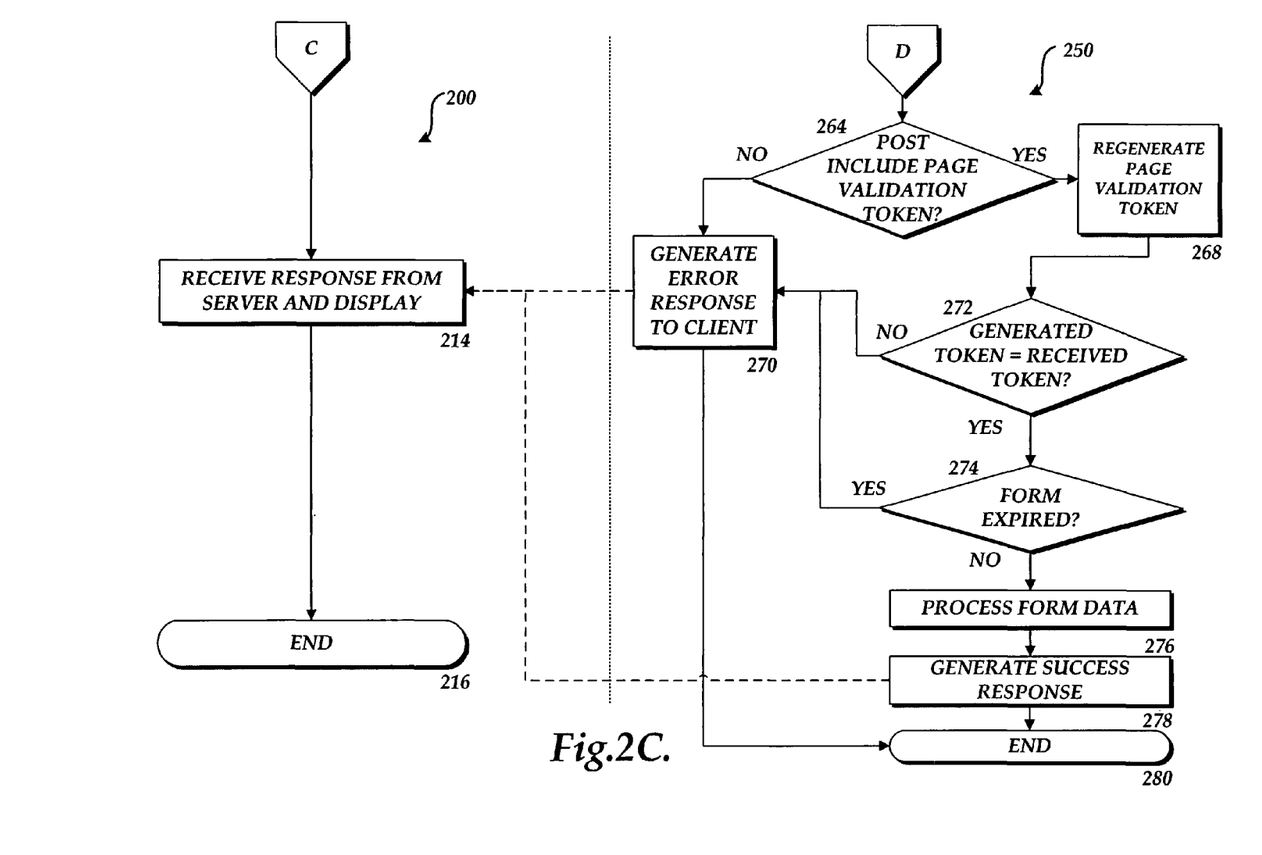

Referring now to FIGS. 2A-2C, additional details will be provided regarding the embodiments presented herein for refreshing a page validation token. In particular, FIGS. 2A-2C are flow diagrams illustrating the operation of the client computer 102 and the server computer 104 according to one implementation. The routine 200 illustrates processing operations performed by the client computer 102 while the routine 250 illustrates processing operations performed by the server computer 104. The routines 200 and 250 will be described in conjunction with one another.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 200 begins at operation 202, where the client computer 102 transmits a request to the server computer 104 for an information page that includes the form 118. In one implementation, the request comprises a hypertext transfer protocol ("HTTP") GET request. The server computer 104 fields the request at operation 252 of the routine 250. In response to receiving the GET request, the routine 250 continues from operation 252 to operation 254, where the server computer 104 generates the page validation token 120 in the manner described above with respect to FIG. 1.

From operation 254, the routine 250 continues to operation 256, where the server computer 104 inserts the page validation token 120 into a hidden field on the form 118. As described above with respect to FIG. 1, the page validation token 120 may be provided to the client computer 102 in a manner other than by inserting the token 120 into a hidden field on the form 118. From operation 258, the routine 250 continues to operation 258 where the page token refresh program 124 is also inserted into the form 118. At operation 260, a response is provided to the GET request that includes the requested form 118, the page validation token 120, and the page token refresh program 124.

At operation 204 of the routine 200, the client computer 102 receives the response to the GET request. In response thereto, the browser 110 displays the form and allows a user to edit the form fields at operation 206. At operation 208, the client computer 102 determines whether a request has been made to post the contents of the form 118 to the server computer 104. For instance, such a request may occur in response to a user selecting an object for posting the form contents or in response to a program object requesting a post of the form. If a request to post the form is not detected, the routine 200 branches back to operation 206 for editing the form.

If, at operation 206, the client computer 102 detects a request to post the form, the routine 200 continues to operation 210, where the page token refresh program 124 is executed. As will be described in greater detail below, the page token refresh program 124 is operative to request and receive an updated page validation token 120 if too much time has passed since the receipt of the previous page validation token 120. Additional details regarding the operation of the page token refresh program 124 will be provided below with respect to FIG. 3.

From operation 210, the routine 200 continues to operation 212 where the form data is posted to the server computer 104. The post includes the form 118, the page validation token 120, and the time value received with the page validation token. In one implementation, this data is posted to the server computer 104 through the use of an HTTP POST command. The server computer 104 receives the request to post the form at operation 262 of the routine 250.

From operation 262, the routine 250 continues to operation 264 where the server computer 104 determines whether the request to post the form included a page validation token 120. If the post request did not include a token, the routine 250 branches to operation 270, where an error response is generated and transmitted to the client computer in response to the post request. The client computer 102 receives and displays the response at operation 214 of the routine 200.

If, at operation 264, the server computer 104 determines that the post request did include a page validation token 120, the routine 250 continues to operation 268. At operation 268, the server computer 104 regenerates the page validation token 120 using the one-way hash algorithm in the manner described above with respect to FIG. 1. Once the page validation token has been regenerated, the routine 250 continues to operation 272 where the server computer 104 determines whether the regenerated page validation token is identical to the page validation token received from the client computer 102 with the post request. If the tokens are not identical, the routine 250 branches to operation 270 where an error response is generated and transmitted to the client computer 102 in the manner described above.

If, at operation 272, the server computer 104 determines that the regenerated page validation token is identical to the page validation token received from the client computer 102 with the post request, then the routine 250 continues from operation 272 to operation 274. At operation 274, the server computer 104 determines whether the form has expired. As described above with reference to FIG. 1, the form is considered to have expired if the validation timeout period has elapsed between the time the page validation token 120 was originally generated by the server computer 104 and the time at which the token 120 was received back from the client computer 102 with the post request. If the form has expired, the routine 250 branches from operation 274 to operation 270 where an error response is generated and transmitted to the client computer 102 in the manner described above.

If, at operation 274, the server computer 104 determines that the form has not expired, the routine 250 continues to operation 276. At operation 276, the server computer 104 processes the received form data. The routine 250 then continues to operation 278, where a success response is generated by the server computer 104, transmitted to the client computer 102, and displayed by the client computer 102 at operation 214 of the routine 200. The routines 200 and 250 end at operations 280 and 216, respectively.

Figure 3:
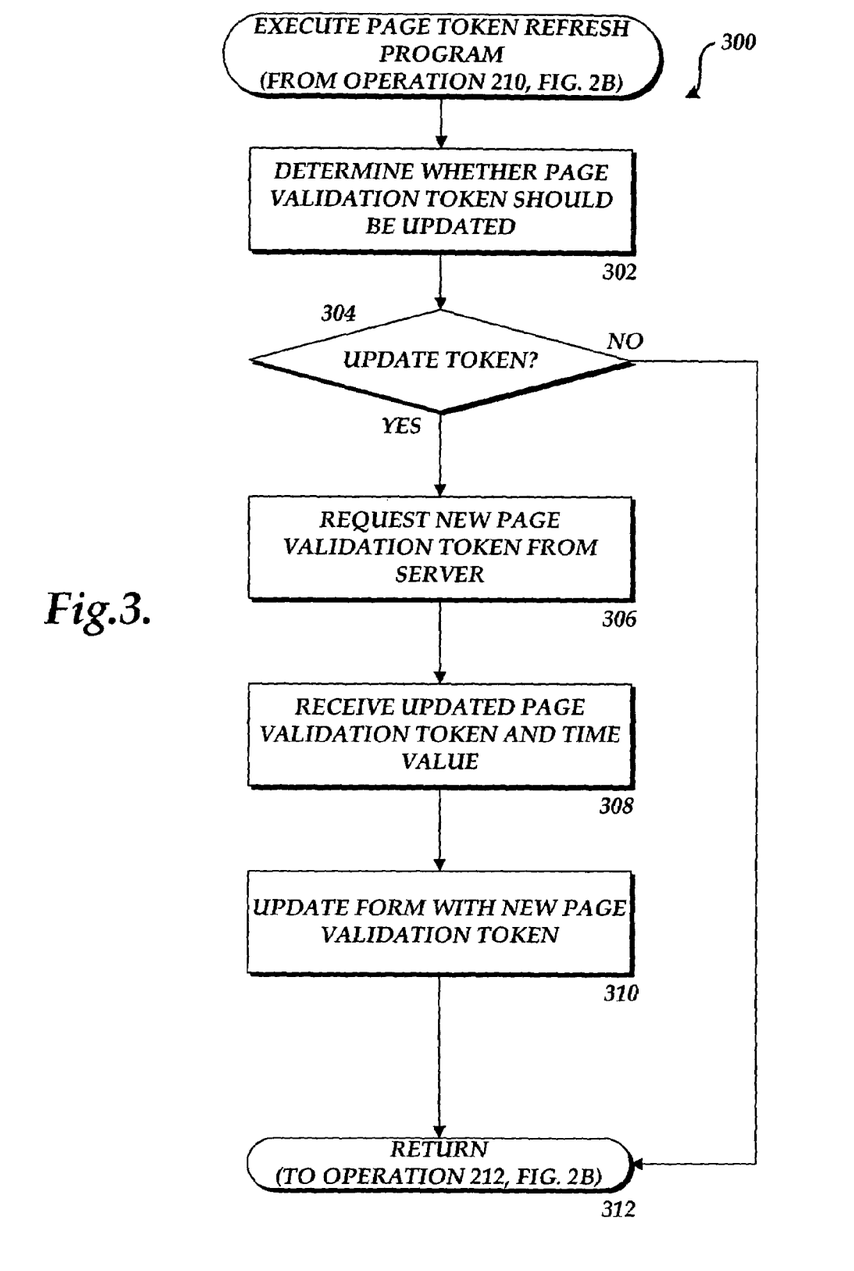

Turning now to FIG. 3, an illustrative routine 300 will be described that illustrates the operation of the page token refresh program 124 in one implementation. The routine 300 begins at operation 302, where the page token refresh program 124 determines whether the page validation token 120 stored at the client computer 102 should be updated. In particular, as discussed above with respect to FIG. 1, the page token refresh program 124 determines whether the page timeout period has elapsed since the server computer 104 generated the page validation token 120. This is determined by computing the elapsed time between the current time and the time the page validation token 120 was generated as specified in the time value provided by the server computer 104 with the form 118.

From operation 302, the routine 300 continues to operation 304, where a determination is made as to whether the page validation token should be updated. If not, the routine 300 branches to operation 312, where it returns to operation 212, described above. If the page validation token 120 does need to be updated, the routine 300 continues from operation 304 to operation 306.

At operation 306, the page token refresh program 124 makes a remote procedure call to the get updated page validation token API 126. The updated page validation token is generated in the manner described above and returned to the client computer 102 along with data indicating the time the updated token was generated at operation 308. At operation 310, the page token refresh program 124 replaces the previous page validation token with the updated page validation token.

In this manner, the client computer 102 only maintains the most recent page validation token 120. From operation 310, the routine 300 returns to operation 212, described above with reference to FIG. 2, where the form 118 and updated page validation token 120 are posted to the server computer 104.

Figure 4:
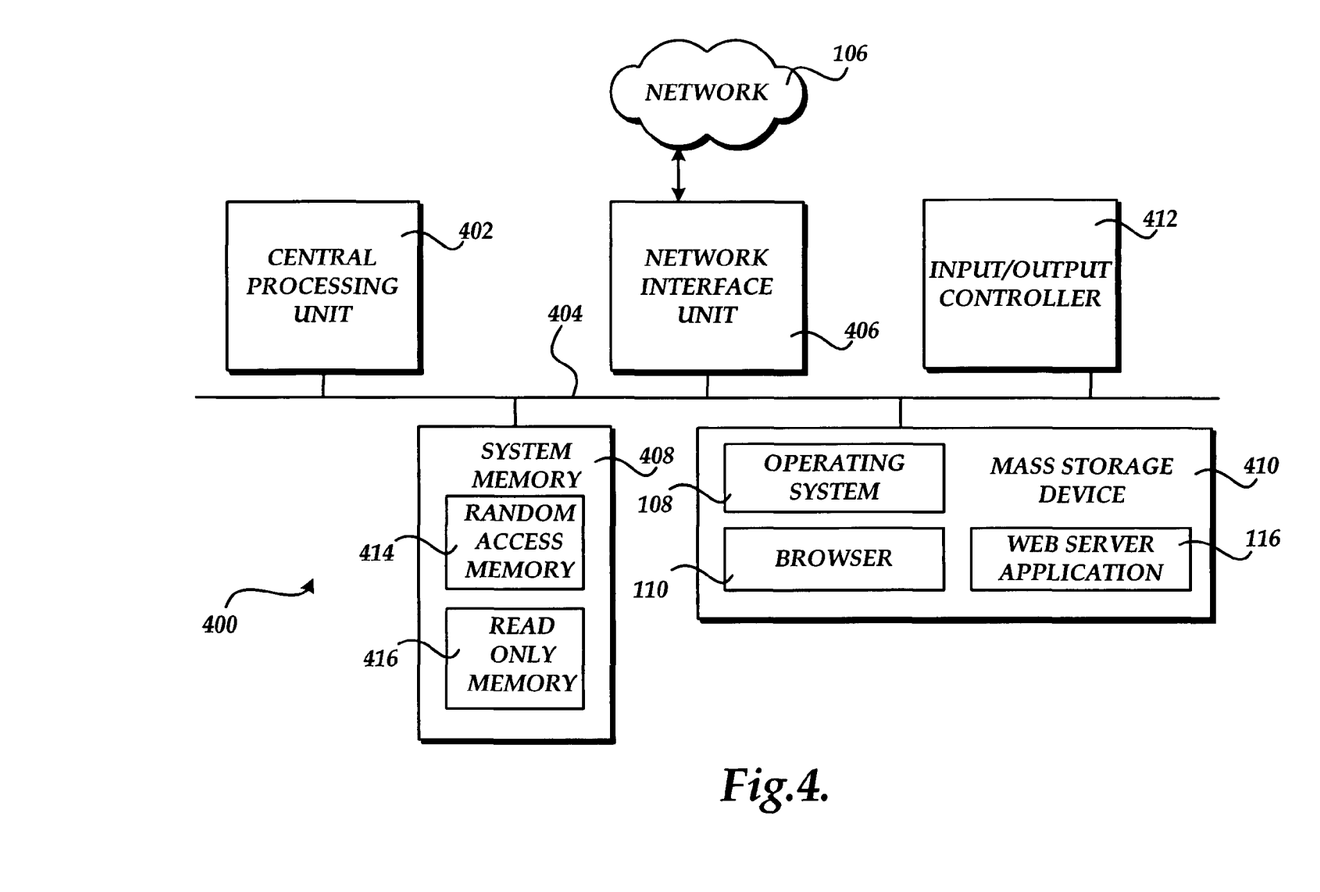
FIG. 4 is a computer architecture diagram showing a computer architecture suitable for implementing the various computer systems described herein.

Referring now to FIG. 4, an illustrative computer architecture for a computer 400 utilized in the various embodiments presented herein will be discussed. The computer architecture shown in FIG. 4 illustrates a conventional desktop, laptop computer, or server computer. The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 108, application programs, and other program modules, which will be described in greater detail below.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 106, such as the Internet. The computer 400 may connect to the network 106 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 108 suitable for controlling the operation of a networked desktop or server computer, such as the WINDOWS XP operating system from MICROSOFT CORPORATION of Redmond, Wash., or the WINDOWS VISTA operating system, also from MICROSOFT CORPORATION. The mass storage device 410 and RAM 414 may also store one or more program modules. In particular, the mass storage device 410 and the RAM 414 may store a Web browser program 110, a Web server application 116, and the other program modules described above with respect to FIG. 1. Other program modules may also be stored in the mass storage device 410 and utilized by the computer 400.

It should be appreciated that although the implementations presented herein have been described in the context of a form 118 being posted by a browser 1120, the data sent to the server 104 may not necessarily come from a Web page that displays a form. A POST request may be sent to a server computer 104 for a variety of other reasons. For instance, in one implementation a Web page includes "Web parts." Web parts are tiles of information on a Web page. A user may use an input device to drag and drop the Web parts to move them around on screen. Web parts may also display a "close" user interface control which, when selected, will temporarily or permanently close the Web part. When a user performs one of these actions on a Web part, the Web page sends a POST request to the server 104 to refresh the Web page, carry out the user actions, and to store the actions for future display of the Web page. In such a scenario, it may be desirable to utilize a page validation token in the manner described herein to ensure that the Web page does not timeout. It should be appreciated, therefore, that the embodiments presented herein may be utilized with any type of POST request being transmitted to a server 104 that may benefit from the use of a page validation token as described herein.

Based on the foregoing, it should be appreciated that systems, methods, and computer-readable media for refreshing a page validation token are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for refreshing a page validation token, the method comprising:

receiving at a server a request for a form, wherein the form comprises at least one data field into which data is entered at the client;

generating by the server a page validation token in response to receiving the request, wherein the page validation token associates the client with the form;

providing by the server a response to the request, the response comprising the requested form, wherein the form further comprises the page validation token and a page token refresh program that when executed, in response to a request to post form data entered into the at least one data field, requests a new page validation token when a determination is made that a first preset period of time has elapsed following the generation of the page validation token;

receiving, at the server, a request for the new page validation token;

authenticating, at the server, the request for the new page validation token;

upon authenticating the request for the new page validation token, generating, at the server, the new page validation token; and sending, by the server, the new page validation token.

2. The computer-implemented method of claim 1, further comprising:

receiving, at the server, a request to post the form, the request comprising form data and the page validation token;

in response to receiving the request, regenerating the page validation token;

determining whether the regenerated page validation token and the page validation token received with the request to post the form are identical;

in response to determining that the regenerated page validation token and the page validation token received with the request to post the form are identical, determining whether the form has expired; and accepting the request to post the form in response to determining that the form has not expired.

3. The computer-implemented method of claim 2, further comprising rejecting the request to post the form in response to determining that the form has expired.

4. The computer-implemented method of claim 2, wherein determining whether the form has expired comprises determining whether a second preset period of time has elapsed between the time the page validation token was generated and the time the request to post the form is received.

5. The computer-implemented method of claim 4, wherein the first preset period of time is shorter than the second preset period of time.

6. The computer-implemented method of claim 5, wherein the first preset period of time is calculated as a percentage of the second preset period of time.

7. A computer-implemented method for refreshing a page validation token, the method comprising:

transmitting by a computing device a request for a form, wherein the form comprises at least one data field into which data is entered at the computing device; and receiving by a computing device a response to the request, the response comprising the requested form, wherein the form further comprises a page validation token and a page token refresh program, wherein the page validation token associates the computing device with the form, and wherein the page token refresh program when executed, in response to a post form data entered into the at least one data field, requests a new page validation token when a determination is made that a first preset period of time has elapsed following the generation of the page validation token.

8. The computer-implemented method of claim 7, wherein the page token refresh program is operative to:

determine whether a preset period of time has elapsed following the generation of the page validation token; and to request an updated page validation token in response to determining that the preset period of time has elapsed.

9. The computer-implemented method of claim 8, wherein the page token refresh program is further operative to receive the new page validation token in response to the request for an new page validation token, and to replace the page validation token received with the form with the new page validation token.

10. The computer-implemented method of claim 9, further comprising posting the form following the execution of the page refresh program.

11. The computer-implemented method of claim 10, wherein posting the form further comprises posting the page validation token.

12. A computer-readable storage medium not consisting of a propagated data signal and having computer-executable instructions stored thereon which, when executed by a computer, cause the computer to:

receive a request for an information page having a form provided therein, wherein the form comprises at least one data field into which data is entered at the computing device;

in response to the request, provide the form, wherein the form further comprises a page validation token and a page token refresh program, wherein the page validation token associates the computing device with the form, and wherein the page token refresh program when executed, in response to post form data entered into the least one data field, requests a new page validation token when a determination is made that a first preset period of time has elapsed following the generation of the page validation token;

expose an application program interface (API) through which a request for the new page validation token may be received;

receive a call to the API from the page refresh program to request the new page validation token;

in response to the API call, attempt to authenticate the request for the new validation token;

in response to authenticating the request for the updated validation token, generate the updated page validation token; and to send the updated page validation token in response to the API call.

13. The computer-readable storage medium of claim 12 having further computer-executable instructions stored thereon which, when executed by the computer, cause the computer to:

receive a request to post the form, the request comprising form data and the page validation token;

in response to receiving the request, to regenerate the page validation token;

determine whether the regenerated page token and the page validation token received with the request to post the form are identical;

in response to determining that the regenerated page validation token and the page validation token received with the request to post the form are identical, to determine whether the form has expired; and to accept the request to post the form in response to determining that the form has not expired.

14. The computer-readable storage medium of claim 13 having further computer-executable instructions stored thereon which, when executed by the computer, cause the computer to reject the request to post the form in response to determining that the form has expired.

15. The computer-readable storage medium of claim 14 wherein determining whether the form has expired comprises determining whether a preset period of time has elapsed between the time the page validation token was generated and when the request to post the form was received.

* * * * *